M. B. GIBERSON.
METALLIC VEHICLE WHEEL.
APPLICATION FILED APR. 8, 1915.

1,180,491.

Patented Apr. 25, 1916.

Witnesses
W. K. Ford
James P. Barry

Inventor
Mason B. Giberson

By Whittemore Hulbert & Whittemore
Attorneys

UNITED STATES PATENT OFFICE.

MASON B. GIBERSON, OF DETROIT, MICHIGAN, ASSIGNOR TO THOMAS H. SIMPSON, OF DETROIT, MICHIGAN.

METALLIC VEHICLE-WHEEL.

1,180,491.   Specification of Letters Patent.   Patented Apr. 25, 1916.

Application filed April 8, 1915.   Serial No. 20,007.

*To all whom it may concern:*

Be it known that I, MASON B. GIBERSON, a citizen of the United States of America, residing at Detroit, in the county of Wayne and State of Michigan, have invented certain new and useful Improvements in Metallic Vehicle-Wheels, of which the following is a specification, reference being had therein to the accompanying drawings.

The invention relates to metallic vehicle wheels, and it is the object of the invention to obtain a construction which may be formed of malleable cast iron.

To this end the invention comprises the construction and method of forming the same as hereinafter set forth.

Figure 1:
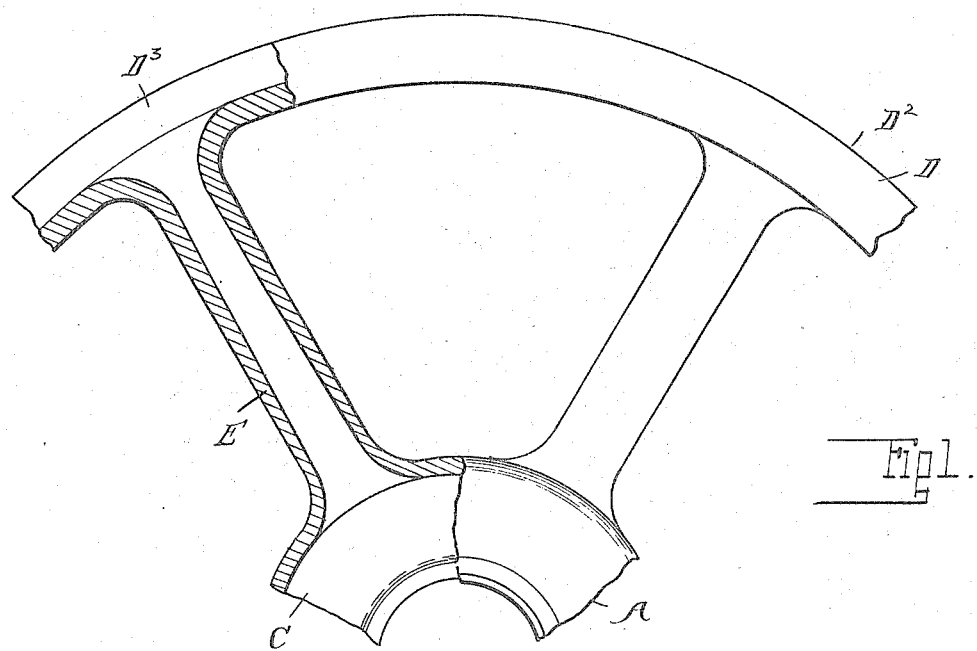
Figure 2:
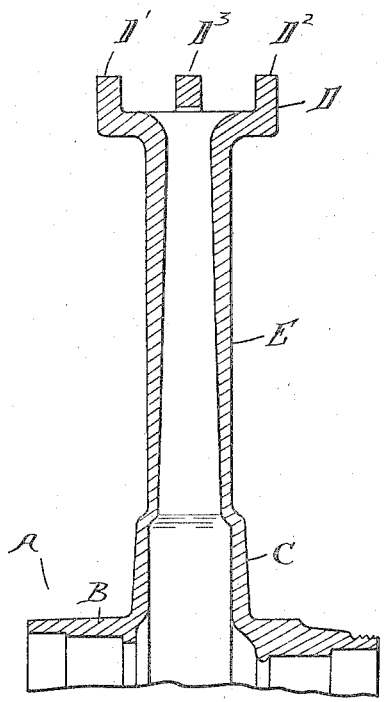

In the drawings: Figure 1 is a sectional side elevation of the wheel; and Fig. 2 is a transverse section.

My improvement is more particularly designed for use on motor trucks and other vehicles designed for carrying relatively heavy loads. For this purpose the wheel comprises essentially a hub, a rim or felly and connecting spokes,—all cast integral. There is, however, a difficulty involved in the construction due to the unequal rate of cooling of the hub and peripheral portion of the wheel, which results in unequal shrinkage and the overstressing of the spokes. Thus the spokes are frequently broken in the casting process, and also in the subsequent annealing process there is great danger of warping or distortion in shape. I have overcome these difficulties by the peculiar distribution of the metal so as to compensate for the unequal rates of cooling and to produce a uniform shrinkage in all portions of the structure.

In detail, A is the hub which has the barrel portion B and central hollow flange C.

D is the rim or felly of an outwardly-opening channel form and preferably provided with side and central flanges D' D² and D³.

E are hollow spokes which connect the hollow flange portion C of the hub with the channel rim D, and which in outward contour are substantially of the usual shape of wooden spokes, tapering slightly from the hub to the rim.

To compensate for the more rapid cooling of the peripheral portion, the walls of the channel D are formed of heavier gage than the walls of the hub A, so that there is a greater mass of metal in relation to the exposed radiating surface. By properly proportioning the parts this will completely compensate for the higher rate of heat dissipation at the periphery, so that the hub and rim will cool down equally and will relieve the spokes from excessive stress. The spokes themselves will be subject to an unequal rate of heat dissipation, increasing from the hub toward the periphery, and this I have also compensated for by increasing the thickness of the wall.

What I claim as my invention is:—

1. A metallic vehicle wheel, comprising a hub portion, hollow radial spoke portions and a rim or felly portion of outwardly-opening channel section, all of said portions being cast integral, the walls of said rim or felly portion being of greater thickness than the walls of said hub portion, and the walls of said spokes being of increasing thickness from hub to rim to compensate for unequal rate of heat dissipation.

2. A metallic vehicle wheel, comprising a hub having a barrel portion and a hollow central flange portion, a rim or felly portion of an outwardly-opening channel section having also a central flange, and radial hollow spoke portions intermediate said hub and felly or rim, all of said portions being cast integral, and the thickness of the walls being progressively increased from hub to periphery to compensate for unequal rates of heat dissipation.

3. A metallic vehicle wheel, comprising a hub portion, hollow radial spoke portions and a rim portion, the walls of said spoke portions being of increasing thickness from the hub portion to the rim portion to compensate for unequal rates of dissipation of heat.

4. A metallic vehicle wheel, comprising a hub portion, hollow radial spoke portions and a rim portion, the walls of said rim portion being of greater thickness than the walls of said hub portion, and the walls of said spoke portions being of increasing thickness from the hub portion to the rim portion to compensate for unequal rate of heat dissipation.

In testimony whereof I affix my signature in presence of two witnesses.

MASON B. GIBERSON.

Witnesses:
JAMES P. BARRY,
ARTHUR D. PULVER.